United States Patent [19]

Oppenlaender et al.

[11] 4,388,213
[45] Jun. 14, 1983

[54] CYCLIC AMIDINE BASED CORROSION INHIBITORS WHICH INHIBIT CORROSION CAUSED BY $CO_2$ AND $H_2S$

[75] Inventors: Knut Oppenlaender, Ludwigshafen; Karl Stork, Lampertheim; Klaus Barthold, Mannheim, all of Fed. Rep. of Germany

[73] Assignee: BASF Aktiengesellschaft, Ludwigshafen, Fed. Rep. of Germany

[21] Appl. No.: 352,634

[22] Filed: Feb. 26, 1982

[51] Int. Cl.³ ............................................. C23F 11/1
[52] U.S. Cl. .................................. 252/392; 106/14.14; 106/14.15; 106/14.31; 208/47; 252/8.55 E; 252/391; 422/12
[58] Field of Search .................. 252/392, 391, 8.55 E; 106/14.14, 14.15, 14.31; 208/47; 422/12

[56] References Cited

U.S. PATENT DOCUMENTS

| | | | |
|---|---|---|---|
| 2,926,169 | 2/1960 | Hughes | 252/8.55 E |
| 2,987,522 | 6/1961 | Shen | 252/8.55 E |
| 3,017,356 | 1/1962 | Hughes et al. | 252/8.55 E |
| 3,450,646 | 6/1969 | Annand et al. | 252/8.55 E |
| 3,531,496 | 9/1970 | Annand et al. | 252/8.55 E |
| 3,584,008 | 6/1971 | Redmore | 252/8.55 E |
| 3,585,210 | 6/1971 | Redmore | 252/8.55 E |
| 3,669,612 | 6/1972 | Ammand et al. | 252/8.55 E |
| 3,711,404 | 1/1973 | Redmore | 252/8.55 E |

*Primary Examiner*—Irwin Gluck
*Attorney, Agent, or Firm*—David L. Hedden; Joseph D. Michaels

[57] ABSTRACT

The invention relates to corrosion inhibitors which are amides of cyclic amidines. The inhibitors are particularly useful for preventing the corrosion of metals caused by $H_2S$ and $CO_2$ in water-in-oil, particularly in saltwater-in-oil emulsions.

5 Claims, No Drawings

CYCLIC AMIDINE BASED CORROSION INHIBITORS WHICH INHIBIT CORROSION CAUSED BY CO₂ AND H₂S

BACKGROUND OF THE INVENTION

1. Field of the Invention

The invention relates to corrosion inhibitors which are amides of cyclic amidines. The inhibitors are particularly useful for preventing the corrosion of metals caused by $H_2S$ and $CO_2$ ("acid gas") in water-in-oil, particularly in saltwater-in-oil emulsions.

2. Description of the Prior Art

It is known to inject a solution or dispersion of corrosion inhibitors in the crude oil during oil recovery, and in the transport or storage of the crude oil so that a protective layer forms on the surface of the metal parts coming in contact with the oil. The crude oil emulsions usually contain saltwater and in many cases, depending upon the origin of the oil, contain $H_2S$ and $CO_2$ which have a pronounced corrosive effect. The corrosion inhibitors to be used for this purpose should be soluble in oil and should at least be dispersible in saltwater so that they can have an optimum effect.

Such systems are known from German published application No. 2,846,977. These are imidazolinium salts which are used dissolved in an oil soluble organic solvent in the presence of a hydrocarbon oil. The problems with such systems are the relatively complicated metering form (3 components) and the fact that the corrosion protection is not satisfactory in all cases. We have noted, for instance, that the imidazoline having the formula

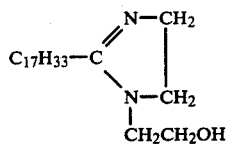

(as chloride) described in the referenced publication does not develop sufficient effectivness against the corrosive erosion caused by the effects of $H_2S$ when used alone.

SUMMARY OF THE INVENTION

The subject invention relates to compositions having the following structural formula:

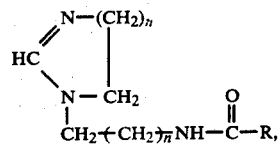

in which R denotes $C_7$- to $C_{25}$-, preferably $C_8$- to $C_{17}$-alkyl or alkenyl radical and n represents the FIG. 1 or 2. The inhibitors may also contain from 0.5 to 100 percent by weight of elementary sulfur relative to the above compounds.

The subject compositions are particularly useful in preventing the corrosion of metal caused by $H_2S$ and $CO_2$ in water-in-oil emulsions such as crude oil. The compositions can be uniformuly distributed in oil-in-water emulsions without the aid of additional solvents.

DESCRIPTION OF THE PREFERRED EMBODIMENTS

The subject compounds are amides of cyclic amidines which are based upon an imidazoline- or 3,5-tetrahydropyrimidine system. The compounds can be obtained in a simple manner by traditional reactions.

Initially a carboxylic acid R—COOH, with R representing a $C_7$- to $C_{25}$-, preferably $C_8$- to $C_{17}$-alkyl or alkenyl radical is reacted with diethylene triamine or di-n-propylene triamine at 120° C. to 160° C. within 5 to 10 hours in a mole ratio of 1:1 to 1:1.2 and the resultant acid amide is reacted with formamide at 120° C. to 150° C. within 0.5 to 2 hours. Following this process the product is condensed at 200° C. to 300° C. preferably under vacuum (1.5 mbars to 80 mbars) within a period of 5 to 10 hours. The resultant imidazoline and/or tetrahydro-pyrimidine derivatives may be isolated in their pure form.

All of the above defined carboxylic acids are suitable as starting carboxylic acids. Preferably chosen are, for instance, n-octanic acid, iso-octanic acid (2-ethylhexanoic acid), iso-nonanoic acid (3,5,5-trimethylhexanic acid), lauric acid, stearic acid, oleic acid, behenic acid and mixtures thereof. Mixtures of natural fatty acids such as tallow fatty acid, coconut fatty acid, colza oil fatty acid and palm kernel fatty acid are also suitable.

The compounds alone have a very satisfactory effect as inhibitors against $H_2S$ and $CO_2$ corrosion. Testing indicates that corrosion is less than a fourth of the value obtained when the compounds are not used.

The inhibition effect can be increased, however, if 0.5 to 100 percent by weight preferably 1 to 30 percent by weight of colloidal sulfur is present relative to amides of the cyclic amidine. The sulfur can be incorporated in this system by a mere admixing of "colloidal" sulfur but is preferably incorporated by heating the mixture to 100° C. to 200° C. within a period of 1 to 3 hours. Inhibitors obtained in this manner are capale of reducing the corrosion to less than one-fifth of the value obtained when the inhibitors are not used.

The subject corrosion inhibitors are added to the water-in-oil emulsions in quantities of 50 ppm to 1000 ppm relative to the weight of the emulsion. They disperse without difficulties in the aqueous as well as in the oil phase.

The following examples will illustrate in detail the invention, but are not intended to limit the scope of its application.

EXAMPLES

Examples 1 and 2 illustrate how the corrosion inhibitors of the subject invention are prepared.

EXAMPLE 1

In a reaction vessel, 423.7 grams of oleic acid are heated to a temperature of 70° C. to 80° C. and at this temperature are added dropwise into 170.3 grams of diethylenetriamine. Following this, reaction water is removed by distillation at 150° C. to 160° C. for 7 to 8 hours. Then 67.6 grams of formamide are added dropwise into the resultant acid amide at 120° C. to 150° C. within a period of 1 hour. Subsequently the mixture is condensed at 200° C. to 250° C. under a vacuum of approximately 20 Torr for 8 hours. The compound had a structure of

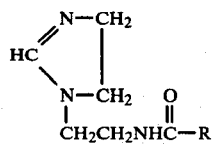

wherein R=C$_{17}$H$_{33}$. The yield was 565 grams of a brown viscous oil.

EXAMPLE 2

In a reaction vessel, 316.4 grams of isononamic acid (3,5,5-trimethylhexanic acid) are heated to a temperature of 70° C. to 80° C. and are added dropwise into 288.7 grams of dipropylenetriamine at this temperature. Following this process, reaction water is removed by distillation at 150° C. to 160° C. for 7 to 8 hours. Then 90 grams of formamide are added dropwise into the resultant acid amide at 120° C. to 150° C. within a period of 30 minutes. Following this, the product is condensed at 200° C. to 250° C. and under vacuum of approximately 20 Torrs separating ammonium. The compound had a structure of

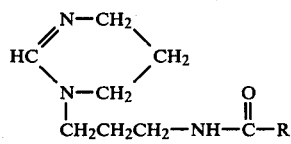

wherein R=C$_8$H$_{17}$. The yield was 560 grams of brown viscous oil.

The corrosion inhibitors and several variations thereof were tested according to the so-called dynamic or "wheel" test. This is a method commonly employed in the crude oil recovery to test inhibitors.

The test samples are iron sheet metal having the dimensions of 130 mm×10 mm×1 mm. These are sanded, degreased with toluene, and are weighed. Test gasoline was used as the test medium which contained 50 percent by weight of saltwater with 3 percent NaCl in emulsified form. In order to simulate field conditions, the test medium was saturated with H$_2$S and CO$_2$ and was poured into test bottles. Following this the inhibitors to be tested were added in quantities of 250 ppm. The test samples of sheet metals were fastened to the bottle covers and were immersed in the test medium.

The test bottles were then fastened to a rotating axis (wheel) which turned in a water bath maintained at 80° C. at a speed of 40 rpm. The test duration was 16 hours.

Thereafter, the test strips were cleaned with an inhibiting acid, were degreased, dried and were weighed in order to determine the weight losses. The results were evaluated and compared with a blank value (test without added inhibitor).

The specific corrosion inhibitors used and the results are shown in the following table.

TABLE

| Compound of Formula | R | Corrosion (mg/sample) |
|---|---|---|
| I | C$_{17}$H$_{33}$ | 22.9 |
| I | C$_{17}$H$_{35}$ | 22.5 |
| II | C$_{17}$H$_{33}$ | 22.4 |
| II | C$_{17}$H$_{35}$ | 21.1 |
| I + 1/5/10% S | C$_{17}$H$_{33}$ | 21.9/21.2/17.4 |
| I + 1/5/10% S | C$_{17}$H$_{35}$ | 22.4/22.7/26.9 |
| II + 1/5/10% S | C$_{17}$H$_{33}$ | 28.6/26.9/23.3 |
| I | i-C$_7$H$_{17}$ | 35.5 |
| I | i-C$_8$H$_{17}$ | 33.8 |
| I | C$_{11}$H$_{23}$ | 28.2 |
| I | C$_{17}$H$_{33}$ | 22.9 |
| I | C$_{17}$H$_{35}$ | 22.5 |
| I | Tallow fatty acid radical | 26.4 |
| I | Coconut fatty acid radical | 24.9 |
| I | Crude oil fatty acid radical | 20.2 |
| I | Palm kernel fatty acid radical | 23.4 |
| II | i-C$_7$H$_{15}$ | 34.8 |
| II | i-C$_8$H$_{17}$ | 29.3 |
| II | C$_{11}$H$_{33}$ | 27.1 |
| II | C$_{17}$H$_{33}$ | 21.1 |
| II | C$_{17}$H$_{33}$ | 22.4 |
| II | Tallow fatty acid radical | 24.2 |
| II | Coconut fatty acid radical | 26.1 |
| II | Colza oil fatty acid radical | 21.3 |
| II | Palm kernel fatty acid radical | 22.7 |
| Blank value (without sulfur) | | 98.3 |
| Blank value (with 10 percent sulfur) | | 114.9 |
| Comparison* | | 52.8 |

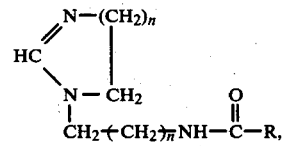

*In accordance with Germany published application 2,846,977.

I claim:
1. A composition of matter having the following structural formula:

$$\begin{array}{c} N-(CH_2)_n \\ HC \\ N-CH_2 \quad O \\ | \quad \quad \quad || \\ CH_2 \text{\textendash}(CH_2)_n NH-C-R, \end{array}$$

in which R represents a C$_7$- to C$_{25}$-alkyl or alkenyl radical and in which n represents the numbers 1 or 2.

2. A composition of matter comprising the product prepared by mixing the composition of claim 1 with elementary sulfur such that from 0.5 to 100 percent by weight of sulfur is present relative to the composition of claim 1.

3. The composition of claim 2 wherein the composition is heated to 100° C. to 200° C. within a period of 1 to 3 hours.

4. A process for inhibiting the corrosion of metals caused by H$_2$S and CO$_2$ in water-in-oil emulsions comprising adding the corrosion inhibitor of claim 1, 2, or 3 to a water-in-oil emulsion.

5. The process of claim 4 wherein from 50 ppm to 1000 ppm of corrosion inhibitor are used relative to the weight of emulsion.

* * * * *